United States Patent
Clarke et al.

(10) Patent No.: US 7,436,576 B2
(45) Date of Patent: Oct. 14, 2008

(54) DISPLAY ELEMENT

(75) Inventors: Andrew Clarke, Hardwick (GB); Eloise H. Welfare, St Albans (GB)

(73) Assignee: Eastman Kodak Company, Rochester, NY (US)

( * ) Notice: Subject to any disclaimer, the term of this patent is extended or adjusted under 35 U.S.C. 154(b) by 193 days.

(21) Appl. No.: 10/586,063

(22) PCT Filed: Mar. 22, 2005

(86) PCT No.: PCT/GB2005/001081

§ 371 (c)(1),
(2), (4) Date: Jul. 14, 2006

(87) PCT Pub. No.: WO2005/096067

PCT Pub. Date: Oct. 13, 2005

(65) Prior Publication Data

US 2007/0164981 A1 Jul. 19, 2007

(30) Foreign Application Priority Data

Apr. 2, 2004 (GB) .................................. 0407641.0

(51) Int. Cl.
G02B 26/00 (2006.01)
G09G 3/34 (2006.01)
(52) U.S. Cl. ........................................ 359/296; 345/84
(58) Field of Classification Search .................. 359/296
See application file for complete search history.

(56) References Cited

U.S. PATENT DOCUMENTS 4,419,663 A 12/1983 Kohashi
4,488,785 A 12/1984 Kohashi
4,569,575 A 2/1986 LePesant et al.
5,956,005 A * 9/1999 Sheridon ..................... 345/84
6,700,556 B2 * 3/2004 Richley et al. ............... 345/84

FOREIGN PATENT DOCUMENTS

EP 0 844 714 12/1998
EP 1 400 834 3/2004

OTHER PUBLICATIONS

"Electro-wetting Displays" by G. Beni et al., Applied Physics Letters, American Institute of Physics, New York, vol. 38, No. 4, Feb. 15, 1981 pp. 207-209.
"Electrocapillarity Modulators and Large Screen Projection Displays" by Micahel Lea, Proceedings of the SPIE, SPIE, Bellingham, VA, vol. 684, Aug. 21, 1986 pp. 45-49.

* cited by examiner

Primary Examiner—Jordan M. Schwartz
Assistant Examiner—James C Jones
(74) Attorney, Agent, or Firm—Thomas J. Strouse

(57) ABSTRACT

A display element comprising at least two conductive porous layers and a conductive liquid, the conductive porous layers comprising a plurality of connected conductive particles insulated from the conductive liquid by a dielectric and lyophobic covering, and means for separately connecting a voltage across the at least two porous layers and the liquid such that on sequential application of a voltage to each conductive layer the liquid is displaced from one location to another location, the liquid only returning to the original location upon alternate sequential application of a voltage.

19 Claims, 6 Drawing Sheets

DISPLAY ELEMENT

FIELD OF THE INVENTION

This invention relates to the field of display elements, in particular to the field of passive display elements.

BACKGROUND OF THE INVENTION

Many companies are actively seeking to create a display element that is easily manufacturable using roll-to-roll coating techniques. These display elements can be either active, i.e. emit light such as LED, OLED, PLED, EL, or passive, i.e. affect the passage, reflection or refraction of light such as LCD, CLC, e-ink etc. Some passive systems are bistable such they can be switched and remain switched after the power has been removed. Most configurations previously disclosed can be readily adapted to colour functionality.

Various electrowetting display elements are known in the prior art.

U.S. Pat. No. 6,473,492 discloses a fluid element device that rearranges fluid within a capillary tube. A voltage is used to move the fluid within the capillary to a desired level. US2002/0080920 discloses a filter device using an array of elements based upon U.S. Pat. No. 6,473,492 for use with X-ray imaging equipment. US2003/0085850 discloses an electrostatic device that changes a meniscus shape such that the focal length of the device changes.

U.S. Pat. No. 6,449,081 describes a focussing element based on the electrowetting phenomenon. WO2/002099527 describes a display element with a defined prismatic structure that contains two immiscible fluids together with electrodes such that the fluid can be rearranged with the cell.

PROBLEM TO BE SOLVED BY THE INVENTION

In display elements based on the rearrangement of liquid it is of benefit to ensure the liquid is captured by capillary forces. This is achieved by making the elements small. Thus the existing art does not easily address the requirement for large pixel areas. Furthermore, the existing art describes structures that necessarily require micro-fabrication and thus relatively complex construction methods not transferable to roll-to-roll manufacture.

It is the purpose of the current invention to provide a new bistable device based on a combination of mechanisms that has previously not been contemplated. This class of device will be adaptable to colour use though the description below is for a single colour element. The display element is capacitative in nature and thus has low power consumption and is switched by low voltages. The element modifies the reflectivity of the surface thereof.

SUMMARY OF THE INVENTION

According to the present invention there is provided a display element comprising at least two conductive porous layers and a conductive liquid, the conductive porous layers comprising a plurality of connected conductive particles insulated from the conductive liquid by a dielectric and lyophobic covering, and means for separately connecting a voltage across the at least two porous layers and the liquid such that on sequential application of a voltage to each conductive layer the liquid is displaced from one location to another location, the liquid only returning to the original location upon alternate sequential application of a voltage.

Preferably at least one further layer is provided adjacent to the at least two conductive porous layers, the liquid having a contact angle with the material of the further layer of less than 60°, the thickness of the further layer being greater than the thickness of each conductive porous layer but less than the combined thickness of the two conductive porous layers.

The invention further provides a device comprising at least one display element as described above including means for connection of each element to a circuit to create a matrix display.

ADVANTAGEOUS EFFECT OF THE INVENTION

The present invention is simple to manufacture over large areas because of the stochastic structure of the elements and may be manufactured via roll-to-roll techniques. It fulfils the requirement of capturing small liquid elements by capillarity. However the switching time of the element is not limited by its area. It is also simple to address and drive, via suitably patterned passive or active matrix type backplanes.

The bi-stable nature of the element allows the device to remain in one state until power is supplied to switch the element to another state.

BRIEF DESCRIPTION OF THE DRAWINGS

The invention will now be described with reference to the accompanying drawings in which.

DETAILED DESCRIPTION OF THE INVENTION

Figure 1:
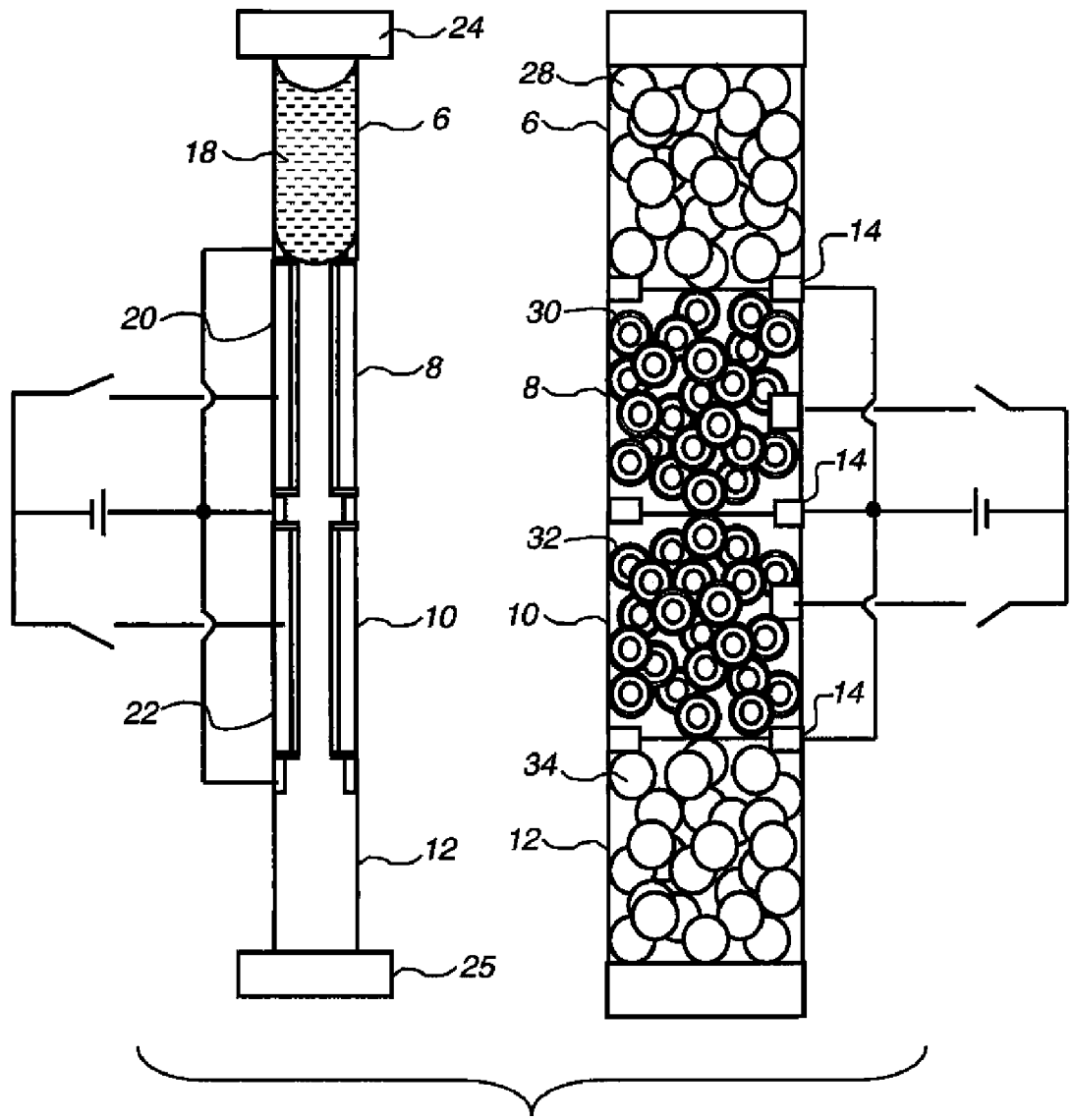
FIG. 1 is a schematic view of an element according to the invention.

FIG. 1 is a schematic view of a display element according to the invention. The invention relates to a passive display element.

Throughout the description and claims the term "upper" defines the side from which an element would be viewed. The term "lower" defines the side opposite the upper side. The terms upper and lower are not to be taken as limiting the orientation of the element according to the invention in any way.

The element illustrated in FIG. 1 is based upon a four layer porous system. The layers, 6, 8, 10 and 12, are located one above another with layer 6 being at the top. Between each layer there is provided a conductor 14 for connection to the liquid. The conductors may comprise wire filaments. Further conductors 20 and 22 are provided in connection with layer 8 and layer 10 respectively. The element is encapsulated by an upper substrate 24 and a lower substrate 26. The substrates may be flexible and conductive. The upper substrate must be of a transparent material.

The upper layer 6 comprises a plurality of particles 28, such as silica. It will be understood by those skilled in the art that silica is only an example of the material which can be used. Any other lyophilic material may be used that can be matched with the refractive index of the liquid used. The particle sizes would be in the order of 30 nm to 2 μm.

A liquid 18 resides in the pore space of the upper layer 6. The liquid may be water but it will be understood by those skilled in the art that it is not essential that the liquid is water. However the liquid must be conductive. The conductive liquid may be created by adding ions to a solvent. Alternatively the conductive liquid may be an ionic liquid. The refractive index of the particles 28 in the upper layer 6 should be substantially the same as the refractive index of the liquid 18. The size of the particles 28 should be a substantial fraction of the wavelength of light, e.g. 200 nm. As the refractive index of the liquid is substantially similar to that of the particles the upper layer will effectively be invisible.

Figure 6:
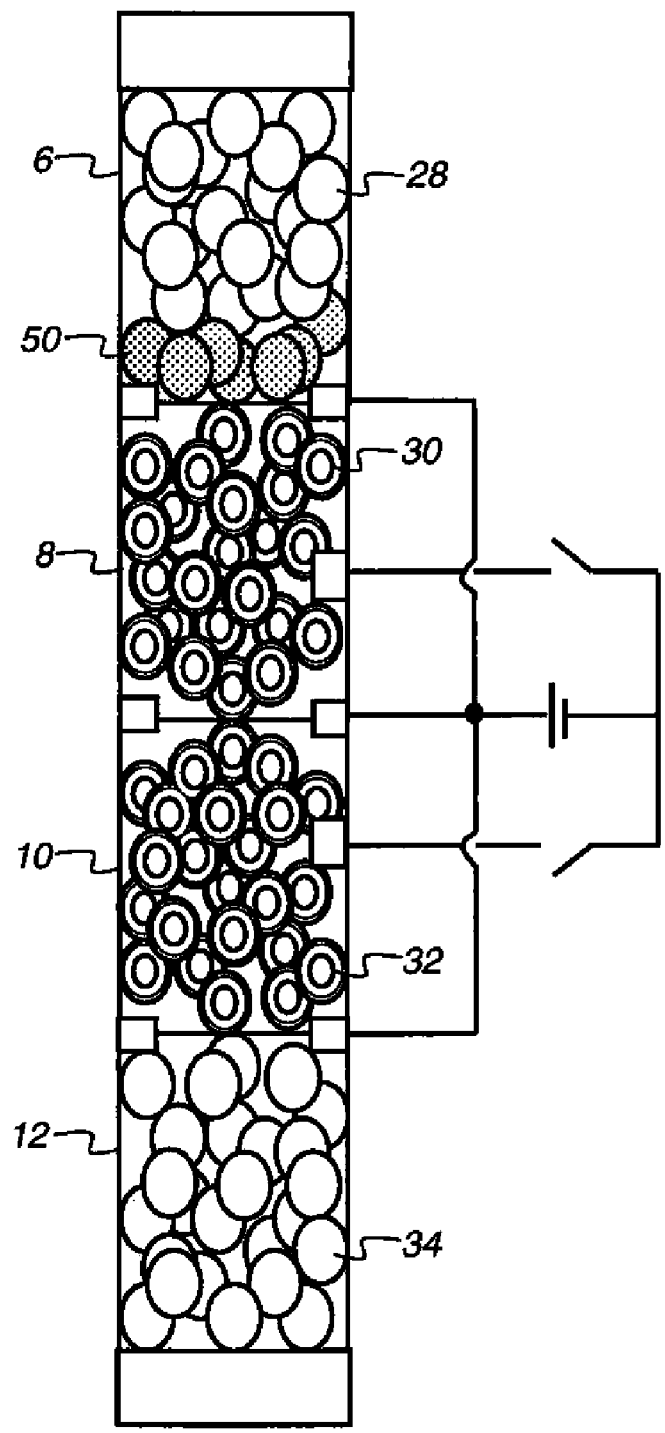
FIG. 6 is a schematic view of an element including an intermediate layer.

Layer 8 comprises a plurality of particles 30. The particles 30 should be of similar size or smaller than the particles 28 in the upper layer 6. The particles may be coloured to provide a coloured pixel or they may be black to provide a black pixel. Alternatively an intermediate layer 50 of coloured or black particles may be provided between the upper layer 6 and the layer 8. Such an embodiment is illustrated schematically in FIG. 6. The particles of this intermediate layer have substantially the same properties, in terms of material, size, shape etc as the particles of the upper layer 6 with the exception that they are coloured. If such an intermediate layer is used it does not matter what colour the particles of the layer 8 are as they will not be seen. A further option would be to use a coloured liquid 18. The liquid may be coloured by the addition of a dye or pigment. A conductor 20 is in connection with layer 8.

The liquid 18 has a contact angle greater than 90° with the particles 30. The particles 30 are conductive. The particles may be solid metal particles or only the shell thereof may be conductive. If the particles have a shell the thickness of the shell can be chosen to create a particular coloured particle. An explanation of this can be found in Seed-mediated Growth Techniques for the Preparation of a Silver Nanoshell on a Silica Sphere, Zhong-jie Jiang and Chun-yan Liu, J. Phys. Chem B 2003, 107, 12411-12415.

Figure 5:
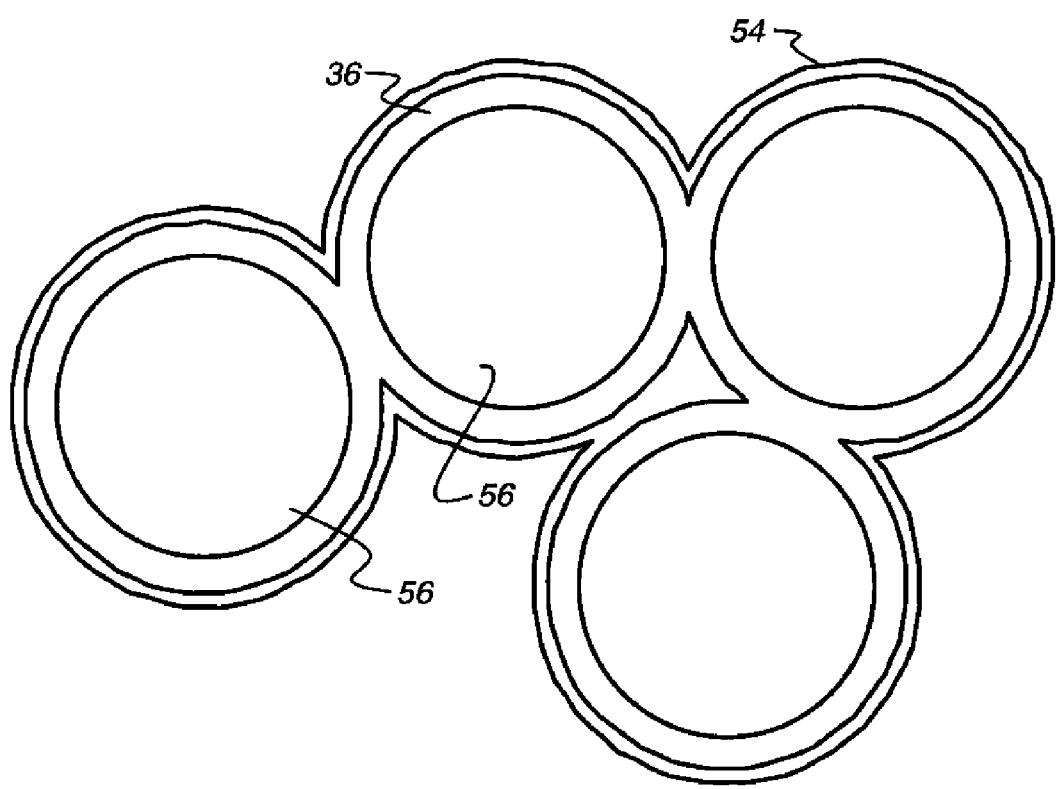
FIG. 5 illustrates a core shell arrangement of particles within the element.

Whichever type of particle is used they should be covered with a thin layer or covering 54 of a lyophobic material with low contact angle hysteresis. The lyophobic material should be an insulator. Suitable particles would be conductive silver particles encased with lyophobic and dielectric mercaptan. It will be understood by those skilled in the art that this is an example only and any conductive material and lyophobic dielectric covering could be used within the terms of the invention. FIG. 5 illustrates a possible core shell arrangement of the particles. The core 56 may be a cheap insulating particle such as silica. A metal shell 36 encapsulates each core 56. The layer of lyophobic material 54 surrounds the shelled particles. The layer 54 may be made of, for example, polymer. Other materials that may be used include a polyelectrolyte, a fluoropolymer, a self assembled monolayer, SAM, or an inorganic shell. However the invention is not to be taken as limited to these materials. The metallic component of the particles 30 in the layer 8 should be connected and the lyophobic covering 54 completely encapsulate the structure.

Layer 10 comprises a plurality of particles 32. The particles 32 are substantially the same as the particles 30 in layer 8. The liquid 18 has a contact angle greater that 90° with the particles 32. The particles are conductive with a thin covering of lyophobic material as described above. A conductor 22 is in connection with layer 10.

The lowermost layer 12 comprises a plurality of particles 34. The particles may comprise any lyophilic material. The particles should be substantially similar to those in layer 6 in terms of contact angle with the liquid, size, etc. The particle sizes would be in the order of 30 nm to 2 μm.

The volume of liquid 18 must be greater than or equal to the volume available in the upper layer 6 or in the lower layer 12. The available volume will therefore be the thickness x the area x porosity. The "porous thickness" of the layers 6, 8, 10 and 12 can be defined by their actual (mechanical) thickness multiplied by the porosity of the material. The term "thickness" as used in the description and claims of this application should be interpreted as the "porous thickness" as defined above.

Each layer 8, 10 has a thickness less than that of layer 6 or 12. However the thickness of layers 8 and 10 combined is greater than that of layer 6 or 12 alone.

As stated above the liquid 18 has a contact angle greater than 90° with the particles 30 in the layer 8. Therefore the capillary pressure in layer 8 is such that no liquid 18 will enter layer 8 from upper layer 6. Thus with no voltage applied to the element the liquid 18 resides in upper layer 6. As the liquid 18 and the particles 28 have a similar refractive index the upper layer 6 will appear essentially transparent or translucent. The particles 30 in the layer 8 scatter the light. Therefore the colour of the particles 30 in layer 8 can be seen. In the embodiment of the invention including an intermediate layer, illustrated in FIG. 6, the colour of the particles forming the intermediate layer will be seen.

Figure 2:
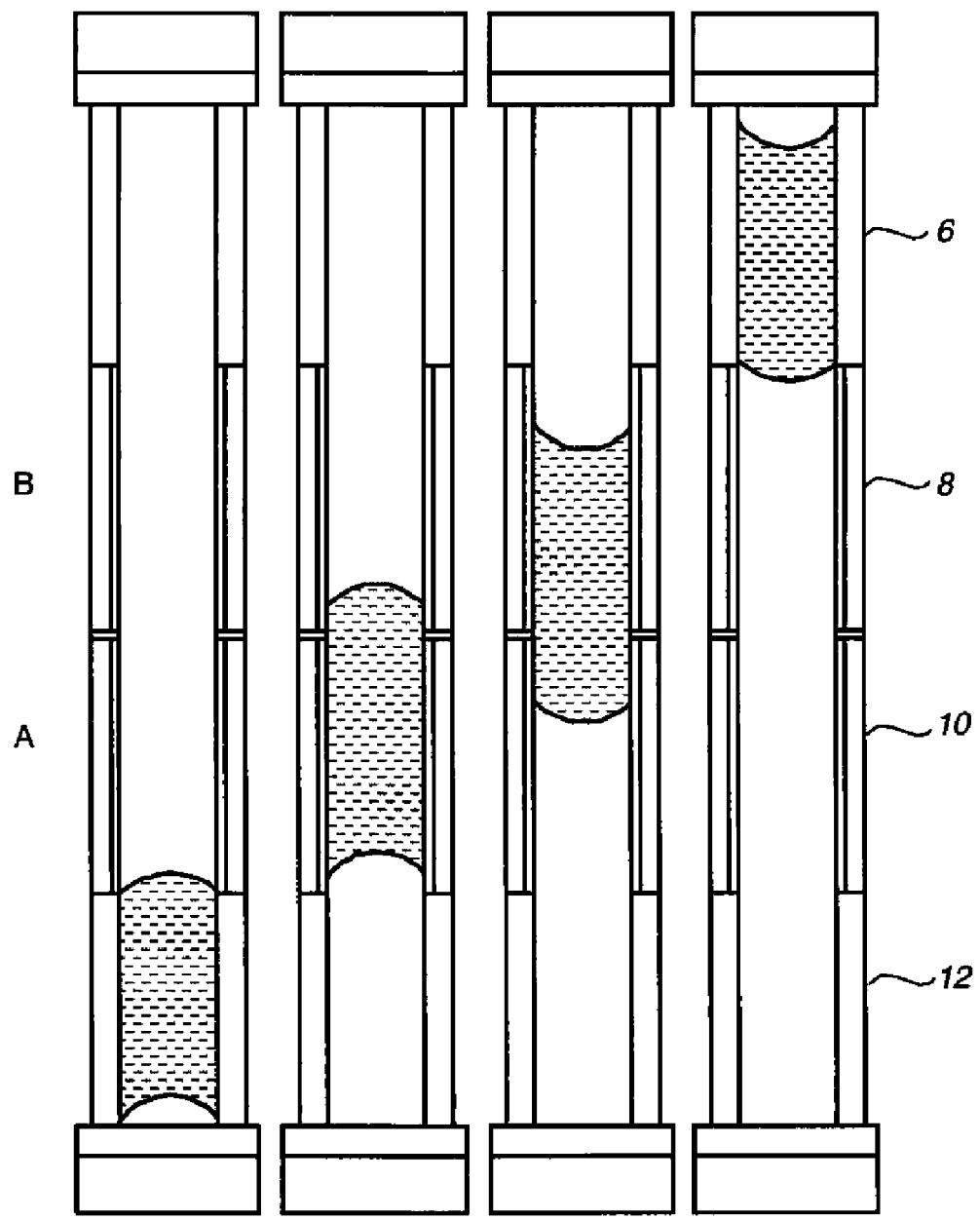
FIG. 2 illustrates switching of the element.

FIG. 2 illustrates what happens when voltage is applied to the element. The voltage applied is in the order of 2 volts, a maximum of 20V being envisaged.

Voltage is applied between the liquid 18 and the conductor 20. An effect called "electrowetting" then takes effect. Electrowetting is explained in Blake et al, Langmuir 2000, 16, 2928-2935. The electrowetting effect reduces the contact angle of the liquid 18 with the layer 8. The usual electrowetting equation may be used $$\cos(\theta) = \cos(\theta_0) + \frac{\varepsilon \varepsilon_0 V^2}{2d\gamma}$$

Where $\theta$ is the contact angle in the presence of a voltage, $\theta_0$ is the contact angle with no voltage, V is the voltage, $\varepsilon$ is the dielectric constant of the lyophobic layer, $\varepsilon_0$ is the permittivity of free space, $\gamma$ is the liquid surface tension and d is the thickness of the lyophobic layer. The capillary pressure, $\Delta P$, within the pore system can be defined as $$\Delta P = \frac{\gamma \cos(\theta)}{a}$$

where $\alpha$ is the average pore radius within the porous structure. If we define the upper layer 6 as A and the layer 8 as B, layer 10 as C and layer 12 as D then;
liquid moves from the upper layer 6 to layer 8 if $\Delta P_A \langle \Delta P_B$
liquid moves from layer 8 to 10 if $\Delta P_A < \Delta P_B < \Delta P_C$
liquid moves from layer 10 to 12 if $\Delta P_B < \Delta P_C < \Delta P_D$ It will be appreciated by those skilled in the art that reversing the capillary pressures moves the liquid in the opposite direction.

With V=0, $\Delta P_A$ is positive and $\Delta P_B$ is negative. The capillary pressure is therefore unfavourable for the liquid 18 to move from layer 6 into the layer 8. When sufficient voltage is applied, $\Delta P_B$ increases until it is greater than $\Delta P_A$ at which point the liquid 18 will move into the layer 8.

When the front of the meniscus of liquid reaches the interface between layers 8 and 10 it will stop as layer 10 is still lyophobic. A voltage, higher than that applied via conductor 20, is then applied between the liquid 18 and the conductor 22. The voltage applied via conductor 20 may be reduced at this point. Layer 10 in turn becomes lyophilic and the difference in capillary pressure in layers 8 and 10 now draws the liquid 18 further down. The liquid 18 withdraws from upper layer 6. The upper layer, now substantially empty of liquid, will strongly scatter light and appear white. The liquid will stop when the front meniscus reaches the interface with layers 10 and 12. On subsequent removal of voltage from conductors 20 and 22 the capillary pressure in layers 8 and 10 changes again and liquid 18 is thus drawn into layer 12 where it will remain. It can thus be seen that the element is bistable. The element will still appear white when the voltage is removed.

To return to the original colour the application of a voltage between the liquid and the conductors 20 and 22 is reversed. Voltage is firstly applied between the liquid and the conductor 22. The layer 10 becomes lyophilic and the contact angle between the liquid 18 and the particles 32 falls. Liquid 18 is therefore drawn from layer 12 to layer 10. As the liquid passes through layer 10 and reaches the interface with layer 8 a larger voltage is applied between the liquid and the conductor 20 and the voltage applied between the liquid and the conductor 22 reduced. The difference in the voltages applied via conductors 22 and 20 changes the capillary pressure in layer 8 to that in layer 10 and the liquid is drawn up to layer 8. At this point all liquid 18 will have left layer 12. The front of the meniscus will be at the interface of layers 6 and 8. Upon removal of the voltage supply to conductors 20 and 22 the liquid will be drawn into upper layer 6. Once the liquid has completely filled layer 6 the element will again appear its original colour.

Figure 3:
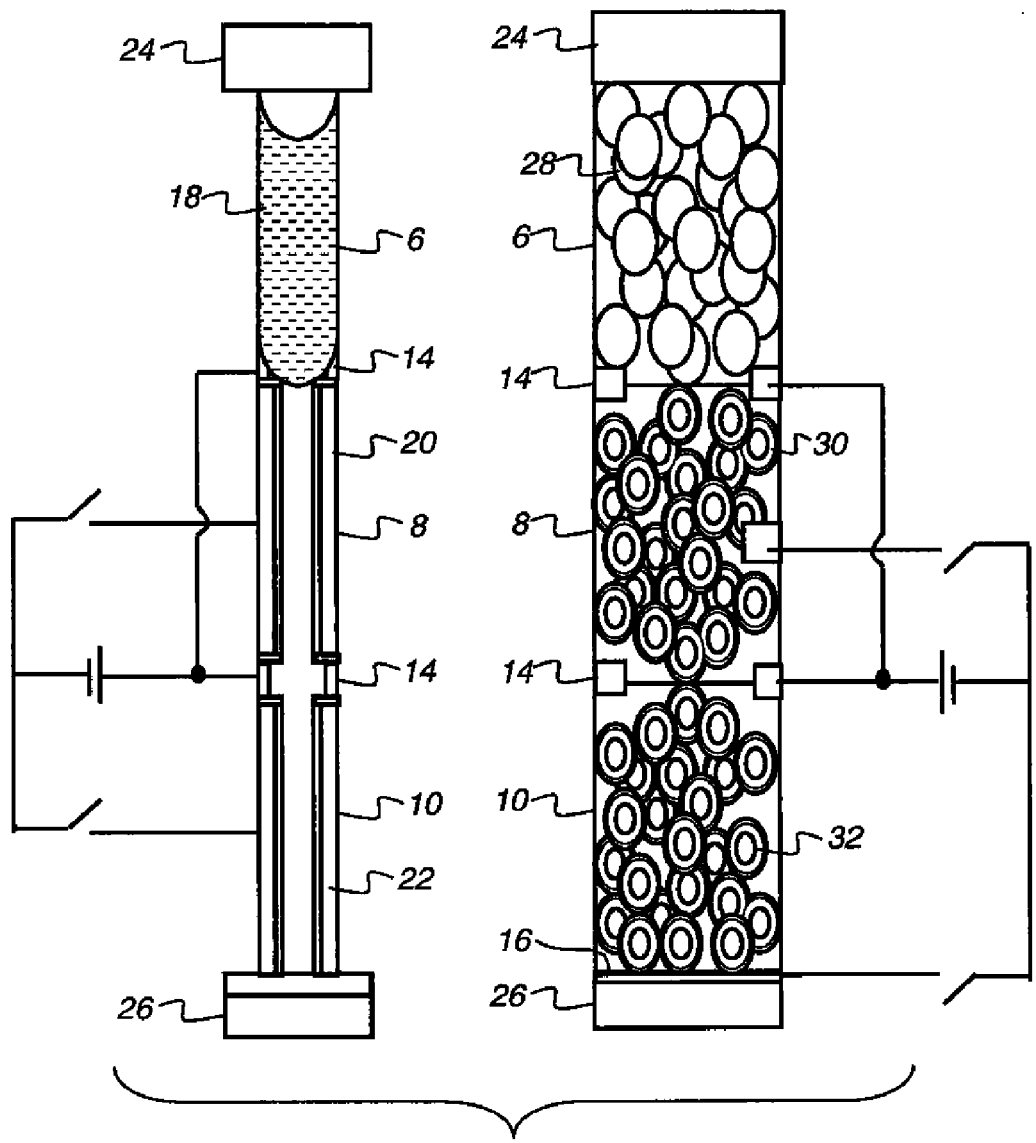
FIG. 3 is a schematic view of another element according to the invention.

FIG. 3 illustrates an element according to a second embodiment of the invention.

The element illustrated in FIG. 3 is based upon a three layer porous system.

The embodiment is similar in many ways to that shown in FIG. 1. The three layers of particles are substantially the same as layers 6, 8 and 10 illustrated in FIG. 1 and therefore will be labelled the same. Between each layer there is provided a conductor 14 for connection with the liquid. This conductor may comprise wire filaments. Conductors 20 and 22 are in connection with layers 8 and 10 as described above. An insulating layer 16 is located below the lowest layer 10. The element is encapsulated by an upper substrate 24 and a lower substrate 26. The upper substrate must be of a transparent material.

Each layer 8, 10 has a thickness less than that of layer 6. However the thickness of layers 8 and 10 combined is greater than that of layer 6 alone.

This element works in essentially the same fashion as the element shown in FIG. 1.

With no application of voltage the liquid will remain in the upper layer 6. The upper layer will therefore effectively be invisible as described above. The colour of the particles in layer 8, or of an intermediate layer if provided, is therefore seen as described with respect to the embodiment shown in FIG. 1. As voltage is applied between the liquid and the conductor 20 the electrowetting effect causes the contact angle of the liquid with the layer 8 to reduce. The liquid therefore starts to be drawn into layer 8, the front meniscus reaching the interface between layers 8 and 10. On application of a higher voltage between the liquid and the conductor 22 layer 10 in turn becomes lyophilic and the difference in capillary pressure in layers 8 and 10 now draws the liquid 18 further down. All liquid withdraws from layer 6 and comes to rest in layers 8 and 10, predominantly in layer 10. As described above the removal of the liquid 18 from layer 6 effects an optical change in that layer.

On removal of the voltages from conductors 20 and 22 the layers 8 and 10 return to being lyophobic. However the liquid does not move from layers 8 and 10 as the meniscus of the liquid is not at the interface of layers 6 and 8 and the capillary pressure is balanced in layers 8 and 10. It can thus be seen that the element shown in FIG. 3 is bistable.

To return to the original colour voltage is applied between the liquid and conductor 20. Due to the difference in capillary pressure now found in layers 8 and 10 the liquid 18 rises until the meniscus reaches the interface of layers 6 and 8. When the voltage is then switched off the difference in capillary pressures in layers 6 and 8 causes the liquid to rise into layer 6. Once the liquid has completely filled layer 6 the element will again appear its original colour.

In the embodiments illustrated in FIGS. 1 and 2 the upper layer 6 may alternatively comprise a photonic crystal structure, for example, opal or reverse opal, rather than a random porous structure. The crystal structure acts a diffraction grating and reflects only particular wavelengths of light. When the gaps in the crystal structure are filled with liquid the photonic nature of the layer is removed and the layer becomes transparent or translucent. Colour from the lower layer is then seen. When liquid is drained from the layer however the layer reflects strongly at a wavelength defined by the structure and spacing dimension of the photonic crystals.

Figure 4:
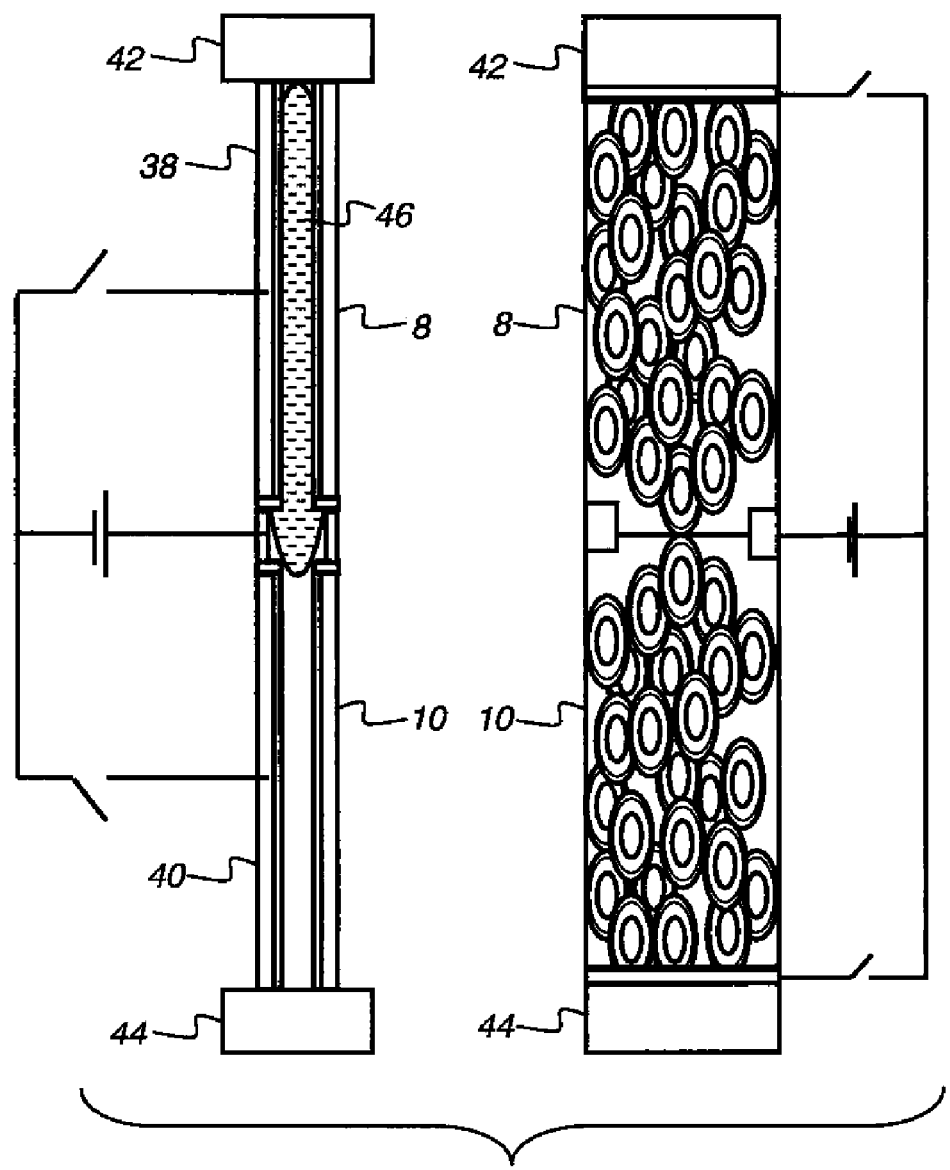
FIG. 4 is a schematic view of a further element according to the invention.

FIG. 4 illustrates an element according to a third embodiment of the invention.

The element illustrated in FIG. 4 is based upon a two layer porous system. The two layers of particles are substantially the same as layers 8 and 10 illustrated in FIG. 1 and therefore will be labelled the same.

As described above the two layers 8 and 10 comprise a plurality of conductive particles. The particles may be solid metal particles or only the shell thereof may be conductive. Whichever type of particle is used they must be covered with a thin layer of lyophobic electrically insulating material as described above. The particle size and particle composition should be the same in each layer 8 and 10. The porous volume and pore size of each layer 8 and 10 should be the same. The layers have the same thickness.

At the side of each layer 8 and 10 there are provided two electrodes 38 and 40 respectively. The electrodes allow a voltage to be applied to the particles in each layer. Insulating substrates 42 and 44 are provided at the top and bottom of the element. Substrate 42 must be transparent. These substrates seal the element.

When the element is made a conductive liquid 46 is forced, by use of electrostatics, into the layer 8. This is achieved by applying a voltage between the layer and the liquid, therefore increasing the capillary pressure as the contact angle of the liquid on the particle surface decreases. When the volume of liquid imbibed into the layer is the same as the available volume in the pores of the layer 8 the upper transparent substrate is laid down, thus sealing the element.

On removal of the voltage the liquid 46 will remain in layer 8. If the liquid is coloured this is the colour that will be seen. It is preferable to use a coloured liquid. This gives the greatest optical contrast between the "on" and "off" states. On application of a voltage between the layer 10 and the liquid via electrodes 40 the layer will become lyophilic and the difference in capillary pressures between layers 8 and 10 allows the liquid 46 to be drawn into layer 10. Once the liquid has been fully imbibed into layer 10 the voltage is switched off. The liquid will remain in layer 10 after removal of the voltage as there is no difference in the capillary pressure in layers 8 and 10. It can thus be seen that the element illustrated in FIG. 4 is bistable. With the liquid in layer 10 the element will show the colour of the particles in layer 8 if viewed from the upper side. If lower substrate 44 were transparent and the element viewed through the lower substrate 44 the colour of the liquid will be seen. An inverse image is thus visible from either end of the element.

To return to the original colour voltage is applied to layer 8 via electrodes 38. Layer 8 thus becomes lyophilic and the difference in capillary pressures between layers 8 and 10 allows the liquid 46 to be drawn into layer 8, returning it to its original colour.

The elements can be made using coating technology. Initially a substrate comprising a pattern of electrodes is prepared by means such as printing. Subsequently a coating process, either multiple single layer coatings or one or more multi-layer coatings is used to lay down the porous layers. The coating process chosen can be unmetered or preferably pre-metered. It is well known in the coating art to manufacture porous particulate layers through single or multi-layer coating processes. The layers will then be dried. The liquid can then be coated and since the top layer is lyophilic, the liquid will fill the upper layer without penetrating the lower layer. A final encapsulating layer is then provided by coating or by lamination and will contain electrodes to connect to the liquid layer.

A matrix or plurality of elements can be assembled to form a display device.

The elements of the display device would be environmentally sealed in order to encapsulate the liquid and prevent moisture ingression and liquid loss.

The invention has been described in detail with reference to preferred embodiments thereof. It will be understood by those skilled in the art that variations and modifications can be effected within the scope of the invention.

The invention claimed is:

1. A display element comprising at least two conductive porous layers and a conductive liquid, the conductive porous layers comprising a plurality of connected conductive particles insulated from the conductive liquid by a dielectric and lyophobic covering, and means for separately connecting a voltage across the at least two porous layers and the liquid such that on sequential application of a voltage to each conductive layer the liquid is displaced from one location to another location, the liquid only returning to the original location upon alternate sequential application of a voltage.

2. A display element as claimed in claim 1 wherein at least one further layer is provided adjacent to the at least two conductive porous layers, the liquid having a contact angle with the material of the further layer of less than 60°, the thickness of the further layer being greater than the thickness of each conductive porous layer but less than the combined thickness of the two conductive porous layers.

3. A display element as claimed in claim 1 wherein the at least one further layer comprises a plurality of particles.

4. A display element as claimed in claim 1 wherein the conductive particles are metallic.

5. A display element as claimed in claim 4 wherein the conductive particles are organic or inorganic particles covered with a conductive shell.

6. A display element as claimed in claim 5 wherein the thickness of the conductive shell is chosen to create a coloured particle.

7. A display element as claimed in claim 1 wherein the dielectric covering is a polymer, a polyelectrolyte, a fluoropolymer, a self assembled monolayer (SAM) or an inorganic shell.

8. A display element as claimed in claim 7 wherein the self assembled monolayer comprises a molecule with a group that bonds to the conductive particles and a group that provides a high contact angle with the liquid.

9. A display element as claimed in claim 2 wherein an intermediate layer of coloured material is provided between the further layer and one of the conductive porous layers.

10. A display element as claimed in claim 9 wherein the material of the intermediate layer comprises a plurality of particles providing an average pore size substantially the same as that of the upper layer, the liquid having a contact angle with the plurality of particles of less than 60°.

11. A display element as claimed in claim 1 wherein each layer has a pore size greater than 30 nm and less than 2 μm.

12. A display element as claimed in claim 2 wherein the conductive liquid and the material of the further layer have substantially the same refractive index.

13. A display element as claimed in claim 1 wherein the conductive liquid is created by adding ions to a solvent.

14. A display element as claimed in claim 1 wherein the conductive liquid is an ionic liquid.

15. A display element as claimed in claim 1 wherein the conductive liquid contains a dye or pigment to provide a coloured liquid.

16. A display element as claimed in claim 2 wherein the further layer comprises a photonic crystal structure.

17. A device comprising at least one display element as claimed in claim 1 including means for connection of each element to a circuit to create a matrix display.

18. A device comprising at least one element as claimed in claim 1, the materials of each layer being coated onto a support material.

19. A device as claimed in claim 18 wherein each element is environmentally sealed.

* * * * *